(12) United States Patent
Koyanagi et al.

(10) Patent No.: US 8,285,284 B2
(45) Date of Patent: Oct. 9, 2012

(54) METHOD FOR HANDOVER BETWEEN DIFFERENT RADIO ACCESS SCHEMES AND WIRELESS COMMUNICATION SYSTEM

(75) Inventors: Kenji Koyanagi, Minato-Ku (JP); Hisashi Futaki, Minato (JP); Yoshikazu Kakura, Minato-Ku (JP)

(73) Assignee: NEC Corporation, Tokyo (JP)

( * ) Notice: Subject to any disclaimer, the term of this patent is extended or adjusted under 35 U.S.C. 154(b) by 501 days.

(21) Appl. No.: 12/404,812

(22) Filed: Mar. 16, 2009

(65) Prior Publication Data

US 2009/0239570 A1 Sep. 24, 2009

(30) Foreign Application Priority Data

Mar. 19, 2008 (JP) ................................ 2008-072393

(51) Int. Cl.
*H04W 36/00* (2009.01)
*H04W 4/00* (2009.01)
*H04B 7/00* (2006.01)

(52) U.S. Cl. ..................... 455/436; 455/432.1; 455/525; 370/329; 370/331

(58) Field of Classification Search .................. 370/331, 370/310, 332, 335, 336, 325, 352, 410, 419, 370/420, 351, 465, 466, 522, 436, 439, 442; 455/134–135, 338, 403, 417, 422.1, 432.1, 455/435.2, 445, 443, 447, 448, 442, 439, 455/552.1–562.1, 466
See application file for complete search history.

(56) References Cited

U.S. PATENT DOCUMENTS 5,870,427 A 2/1999 Tiedemann, Jr. et al.
5,978,679 A * 11/1999 Agre .............................. 455/442
6,438,117 B1 * 8/2002 Grilli et al. ..................... 370/331
6,594,489 B2 * 7/2003 Holcman ..................... 455/432.1
6,782,274 B1 * 8/2004 Park et al. ................... 455/552.1
6,965,585 B2 * 11/2005 Grilli et al. ..................... 370/331
6,975,608 B1 * 12/2005 Park et al. ..................... 370/332

(Continued)

FOREIGN PATENT DOCUMENTS

EP    1816878 A1    2/2006

(Continued)

OTHER PUBLICATIONS

"3GPP TS 36.300 V8.3.0", Third Generation Partnership Project; Technical Specification Group Radio Access Network; Evolved Universal Terrestrial Radio Access Network (E-UTRAN); Overall description, Dec. 2007, pp. 1-5, Stage 2, Release 8.

(Continued)

Primary Examiner — Dwayne Bost
Assistant Examiner — Scott Trandai
(74) Attorney, Agent, or Firm — Sughrue Mion, PLLC

(57) ABSTRACT

In a wireless communication system including a plurality of base stations each supporting at least one of two or more radio access schemes and at least one mobile station capable of performing communication by using the two or more radio access schemes, before the mobile station moves from a source base station to a target base station, the target base station notifies the mobile station, via the source base station, of a transparent container containing uplink radio access information that specifies a radio access scheme enabling at least an initial connection to be made. Thus, the mobile station identifies the radio access scheme supported by the target base station from the transparent container before moving from the source base station to the target base station.

16 Claims, 5 Drawing Sheets

U.S. PATENT DOCUMENTS

| | | | |
|---|---|---|---|
| 7,016,326 B2* | 3/2006 | Holcman et al. | 370/331 |
| 7,054,628 B2* | 5/2006 | Holcman et al. | 455/432.1 |
| 7,151,758 B2* | 12/2006 | Kumaki et al. | 370/331 |
| 7,251,490 B2* | 7/2007 | Rimoni | 455/436 |
| 7,346,032 B2* | 3/2008 | Holcman et al. | 370/331 |
| 7,395,065 B2* | 7/2008 | Dorenbosch | 455/436 |
| 7,469,142 B2* | 12/2008 | Nelakanti et al. | 455/436 |
| 7,499,705 B2* | 3/2009 | Rimoni et al. | 455/436 |
| 7,519,368 B2* | 4/2009 | Lim et al. | 455/436 |
| 7,529,553 B2* | 5/2009 | Koyanagi | 455/457 |
| 7,586,988 B2* | 9/2009 | Koyanagi | 375/260 |
| 7,596,378 B1* | 9/2009 | Nizri et al. | 455/448 |
| 7,778,641 B1* | 8/2010 | Willars et al. | 455/436 |
| 7,860,075 B2* | 12/2010 | Benjebbour et al. | 370/347 |
| 7,876,729 B1* | 1/2011 | Grilli et al. | 370/332 |
| 7,961,687 B2* | 6/2011 | Holcman et al. | 370/331 |
| 7,970,403 B2* | 6/2011 | Ishii et al. | 455/436 |
| 2002/0191562 A1* | 12/2002 | Kumaki et al. | 370/331 |
| 2005/0013327 A1* | 1/2005 | Koyanagi | 370/535 |
| 2006/0166672 A1* | 7/2006 | Lim et al. | 455/436 |
| 2006/0199590 A1* | 9/2006 | Park | 455/445 |
| 2006/0281415 A1* | 12/2006 | Koyanagi | 455/67.15 |
| 2006/0285599 A1* | 12/2006 | Seki et al. | 375/260 |
| 2007/0211687 A1* | 9/2007 | Benjebbour et al. | 370/347 |
| 2007/0293224 A1* | 12/2007 | Wang et al. | 455/436 |
| 2008/0305800 A1* | 12/2008 | Sharp et al. | 455/438 |
| 2008/0310341 A1* | 12/2008 | Koyanagi | 370/328 |
| 2009/0080454 A1* | 3/2009 | Koyanagi | 370/445 |
| 2009/0122886 A1* | 5/2009 | Oketani et al. | 375/260 |
| 2009/0239570 A1* | 9/2009 | Koyanagi et al. | 455/525 |
| 2009/0257398 A1* | 10/2009 | Koyanagi et al. | 370/331 |
| 2009/0279420 A1* | 11/2009 | Koyanagi | 370/210 |
| 2009/0290570 A1* | 11/2009 | Kishiyama et al. | 370/344 |
| 2010/0111047 A1* | 5/2010 | Yang et al. | 370/336 |
| 2010/0157885 A1* | 6/2010 | Koyanagi et al. | 370/328 |
| 2010/0172438 A1* | 7/2010 | Koyanagi et al. | 375/296 |
| 2010/0234029 A1* | 9/2010 | Ishii et al. | 455/437 |
| 2010/0255836 A1* | 10/2010 | Chen | 455/426.1 |
| 2010/0316041 A1* | 12/2010 | Koyanagi | 370/344 |
| 2010/0329199 A1* | 12/2010 | Liu et al. | 370/329 |
| 2010/0330982 A1* | 12/2010 | Ishii et al. | 455/422.1 |
| 2011/0002282 A1* | 1/2011 | Inoue et al. | 370/329 |
| 2011/0032904 A1* | 2/2011 | Morales et al. | 370/331 |
| 2011/0075750 A1* | 3/2011 | Miki et al. | 375/260 |
| 2011/0110322 A1* | 5/2011 | Koyanagi et al. | 370/329 |
| 2011/0110357 A1* | 5/2011 | Chung et al. | 370/344 |
| 2011/0113433 A1* | 5/2011 | Koyanagi et al. | 718/104 |

FOREIGN PATENT DOCUMENTS

| | | |
|---|---|---|
| JP | 2001-054168 A | 2/2001 |
| JP | 2003235064 A | 8/2003 |
| JP | 2007151059 A | 6/2007 |
| WO | 01/78440 A1 | 10/2001 |
| WO | WO 2007015795 A2 | 2/2007 |
| WO | WO 2007057977 A1 | 5/2007 |
| WO | 2008/010063 A2 | 1/2008 |

OTHER PUBLICATIONS

Communication dated Dec. 21, 2011 from the Japanese Patent Office in counterpart Japanese application No. 2008-072393.

* cited by examiner

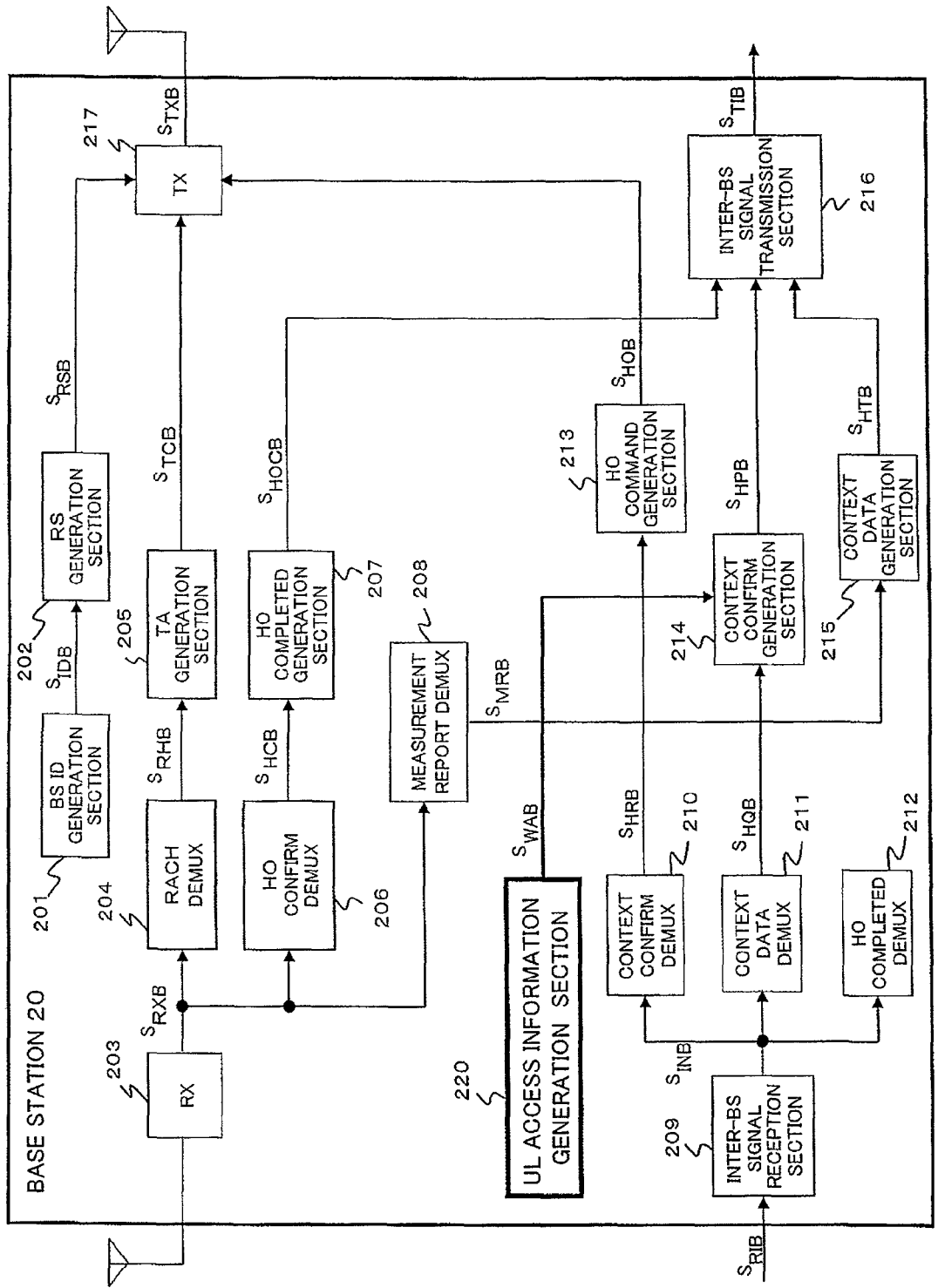

METHOD FOR HANDOVER BETWEEN DIFFERENT RADIO ACCESS SCHEMES AND WIRELESS COMMUNICATION SYSTEM

BACKGROUND OF THE INVENTION

1. Field of the Invention

This application is based upon and claims the benefit of priority from Japanese Patent Application No. 2008-072393, filed on Mar. 19, 2008, the disclosure of which is incorporated herein in its entirety by reference.

The present invention relates to a wireless communication system including a plurality of base stations and at least one mobile station and, more particularly, to a method for handover between different radio access schemes as well as to a base station and mobile station for implementing the method.

2. Description of the Related Art

Currently, various radio transmission schemes, such the third generation mobile systems (3G), standard specification for broadband wireless access (WiMAX: Worldwide Interoperability for Microwave Access), and standard specification for wireless LAN (WiFi: Wireless Fidelity), have been proposed and are in practical use. However, these different schemes provide different transmission rates and different coverages. Since the transmission rate and coverage are in a tradeoff relationship in general, it is impossible to achieve a high transmission rate and wide-area coverage at the same time with a single radio transmission system. Therefore, there are some cases where appropriate radio transmission schemes are set according to various circumstances, with the result that cells using different radio transmission schemes are next to each other. For such a wireless communication system in which a plurality of radio transmission schemes coexist, several handover techniques are proposed that can be used when a wireless terminal capable of operating with each of these radio transmission schemes moves from a cell using one of the radio transmission schemes to a cell using another one of the radio transmission schemes.

For example, in a mobile communication system disclosed in Japanese Patent Application Unexamined Publication No. 2001-54168, a mobile terminal receives radio signals of all communication systems (radio transmission schemes) that the mobile terminal can use, identifies the type of each communication system and also calculates the quality of communication QoS from the respective signals' frequencies, and then reports these results to a base station (source base station) that the mobile terminal is currently communicating with. When the mobile terminal is notified of a target base station to switch to from the network side in response to the report, the mobile terminal secures a radio link with each of the source base station and the target base station and then switches to the target-side radio transmission scheme.

Moreover, according to the Inter Radio Access Technology (RAT) handover described in 3GPP TS 36.300 V8.3.0 (2007-12), a target system provides information regarding its radio transmission scheme (including the radio resource structure, information on the target cell system, and the like) to a mobile terminal via a currently communicating source system, thus enabling the mobile terminal to switch to the target system's radio transmission scheme.

However, according to the method in which a mobile station identifies the type of a signal source's radio transmission scheme based on the frequency of a received downlink radio signal, the type of a radio transmission scheme cannot be identified from a frequency in use, in a system, such as a cognitive radio system, where a plurality of radio transmission schemes may use available frequencies.

Moreover, in a case where a plurality of radio access schemes coexist in a single wireless communication system, such as a wireless LAN (IEEE 802.11) in which IEEE 802.11a/IEEE 802.11g using multi-carrier Orthogonal Frequency Division Multiplexing (OFDM) and IEEE 802.11b using a single carrier coexist, a radio access scheme cannot be identified from a frequency band in use, because IEEE 802.11g and IEEE 802.11b use the same frequency.

Another possible method for identifying a radio access scheme is that a mobile station receives a common control signal periodically transmitted by a base station and, based on the result of demodulating the signal, identifies a radio transmission scheme used by this base station. However, according to this method, since the mobile station does not identify a target base station's radio transmission scheme until the mobile station receives a common control signal, a delay of about twice an interval between common control signal transmissions, or longer, may occur, causing a delay in handover.

SUMMARY OF THE INVENTION

Accordingly, an object of the present invention is to provide a handover method that can suppress a delay in handover between different radio access schemes, as well as a wireless communication system.

According to the present invention, a method for handover between base stations in a wireless communication system which includes a plurality of base stations and at least one mobile station, wherein each of the plurality of base stations supports at least one of two or more radio access schemes and the mobile station is operable in the two or more radio access schemes, includes: before the mobile station moves from a first base station to a second base station, the second base station notifying the mobile station of transfer information which specifies a radio access scheme allowing the mobile station to make at least initial connection to the second base station; and before the mobile station moves from the first base station to the second base station, the mobile station recognizing the radio access scheme of the second base station from the transfer information.

According to the present invention, a wireless communication system comprising a plurality of base stations and at least one mobile station, wherein each of the plurality of base stations supports at least one of two or more radio access schemes and the mobile station is operable in the two or more radio access schemes, wherein each of the plurality of base stations comprises: a base station communication section for communicating with a mobile station in at least one of two or more radio access schemes; and a notifying section for notifying the mobile station of transfer information which specifies a radio access scheme allowing the mobile station to make at least initial connection to the base station before the mobile station moves from another base station to the base station, and the mobile station comprises: a demultiplexer for demultiplexing transfer information from a control signal received from a first base station before the mobile station moves from the first base station to a second base station, wherein the transfer information specifies a radio access scheme allowing the mobile station to make at least initial connection to the second base station; and a mobile station communication section for performing the initial connection to the second base station according to the radio access scheme of the second base station included in the transfer information.

According to the present invention, a base station in a wireless communication system which includes two or more radio access schemes, includes: a communication section for communicating with a mobile station in at least one of two or more radio access schemes; and a notifying section for notifying the mobile station of transfer information which specifies a radio access scheme allowing the mobile station to make at least initial connection to the base station before the mobile station moves from another base station to the base station.

According to the present invention, a mobile station which is capable of communicating with a plurality of base stations, each of which supports at least one of two or more radio access schemes, includes: a demultiplexer for demultiplexing transfer information from a control signal received from a first base station before the mobile station moves from the first base station to a second base station, wherein the transfer information specifies a radio access scheme allowing the mobile station to make at least initial connection to the second base station; and a communication section for performing the initial connection to the second base station according to the radio access scheme of the second base station included in the transfer information.

According to the present invention, it is possible to suppress a delay in handover between different radio access schemes.

BRIEF DESCRIPTION OF THE DRAWINGS

FIG. 5 is a block diagram showing a functional configuration of a base station in the wireless communication system according to the present example.

DETAILED DESCRIPTION OF THE PREFERRED EMBODIMENTS

1. Exemplary Embodiment

In a wireless communication system according to an exemplary embodiment of the present invention, it is assumed that at least one of a plurality of different radio access schemes is supported each cell and that a mobile station has a radio transceiver capable of performing communication by using at least one of these radio access schemes. According to the present invention, when a mobile station that is performing communication moves between cells in which different radio access schemes are supported, a handover-target base station notifies the mobile station of information specifying the radio access scheme used by the handover target cell before handover processing is started, whereby fast handover can be achieved.

Figure 1:
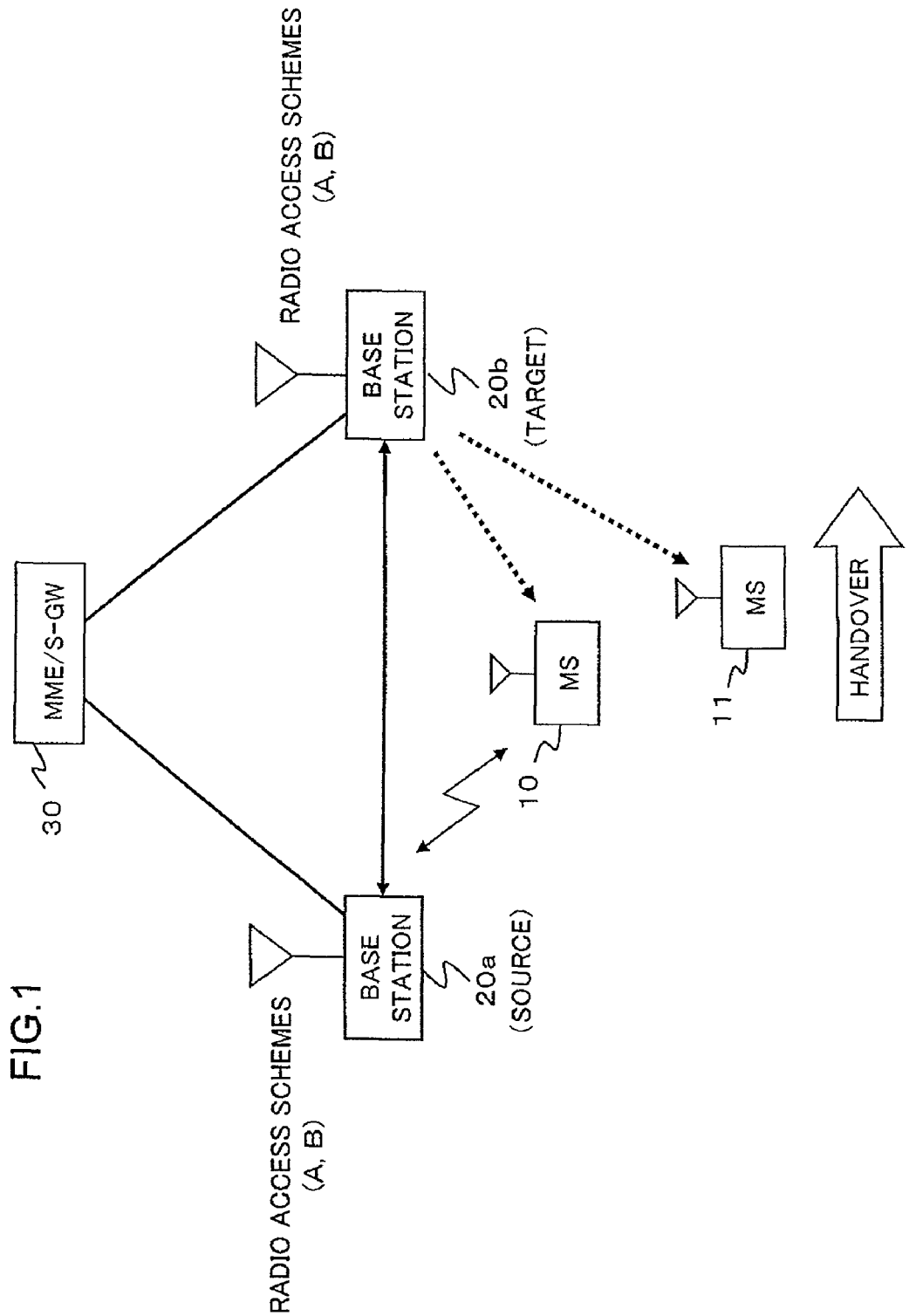
FIG. 1 is a diagram of a system structure to describe handover in a wireless communication system according to an exemplary embodiment of the present invention.

FIG. 1 is a diagram of a system structure to describe handover in the wireless communication system according to the present exemplary embodiment of the present invention. For simplicity of description, assumed here is a wireless communication system in which two different radio access schemes A and B are supported by the same radio transmission system, and in which each base station supports these two radio access schemes. However, this is not restrictive, and it is sufficient that each base station supports at least one radio access scheme. Here, it is assumed that base stations 20a and 20b are connected to the same mobile management entity/serving gateway (MME/S-GW) 30.

Moreover, for convenience of description, here illustrated is a case as an example where handover between base stations (hereinafter, referred to as "inter-BS handover") is performed for two mobile stations 10 and 11, each of which is assumed to be capable of using both the radio access schemes A and B to perform radio communication. Assuming the mobile stations 10 and 11 move and switch connection from the base station 20a to the base station 20b, the base station 20a is a source base station, which is a handover source, and the base station 20b is a target base station, which is a handover target.

According to the present exemplary embodiment, before inter-BS handover is carried out, the target base station 20b notifies each mobile station of information specifying a radio access scheme to use. For example, the mobile station 10 is notified of information specifying the radio access scheme A, and the mobile station 11 is notified of information specifying the radio access scheme B. A control signal required for handover processing may bear this information specifying a radio access scheme to each of the mobile stations 10 and 11 from the target base station 20b via the source base station 20a, which will be described later.

Examples of the wireless communication system in which different radio access schemes are supported by the same radio transmission system include a system in which two types of base stations coexist, for example, one supporting a single-carrier scheme and the other supporting a multi-carrier scheme, and a system such as a wireless LAN (IEEE 802.11) as described earlier in which the radio access scheme of IEEE 802.11a/802.11g using multi-carrier OFDM and the radio access scheme of IEEE 802.11b using a single carrier coexist.

Hereinafter, an example of the present invention will be described in detail by using as an example a wireless communication system proposed in Third Generation Partnership Project (3GPP) Long Term Evolution (LTE). In this case, a base station is sometimes denoted as eNB, and a mobile station is sometimes denoted as UE. Additionally, "handover," "uplink," and "downlink" will be abbreviated as "HO," "UL," and "DL," respectively, where appropriate.

2. Example 2.1) Handover Procedure

Figure 2:
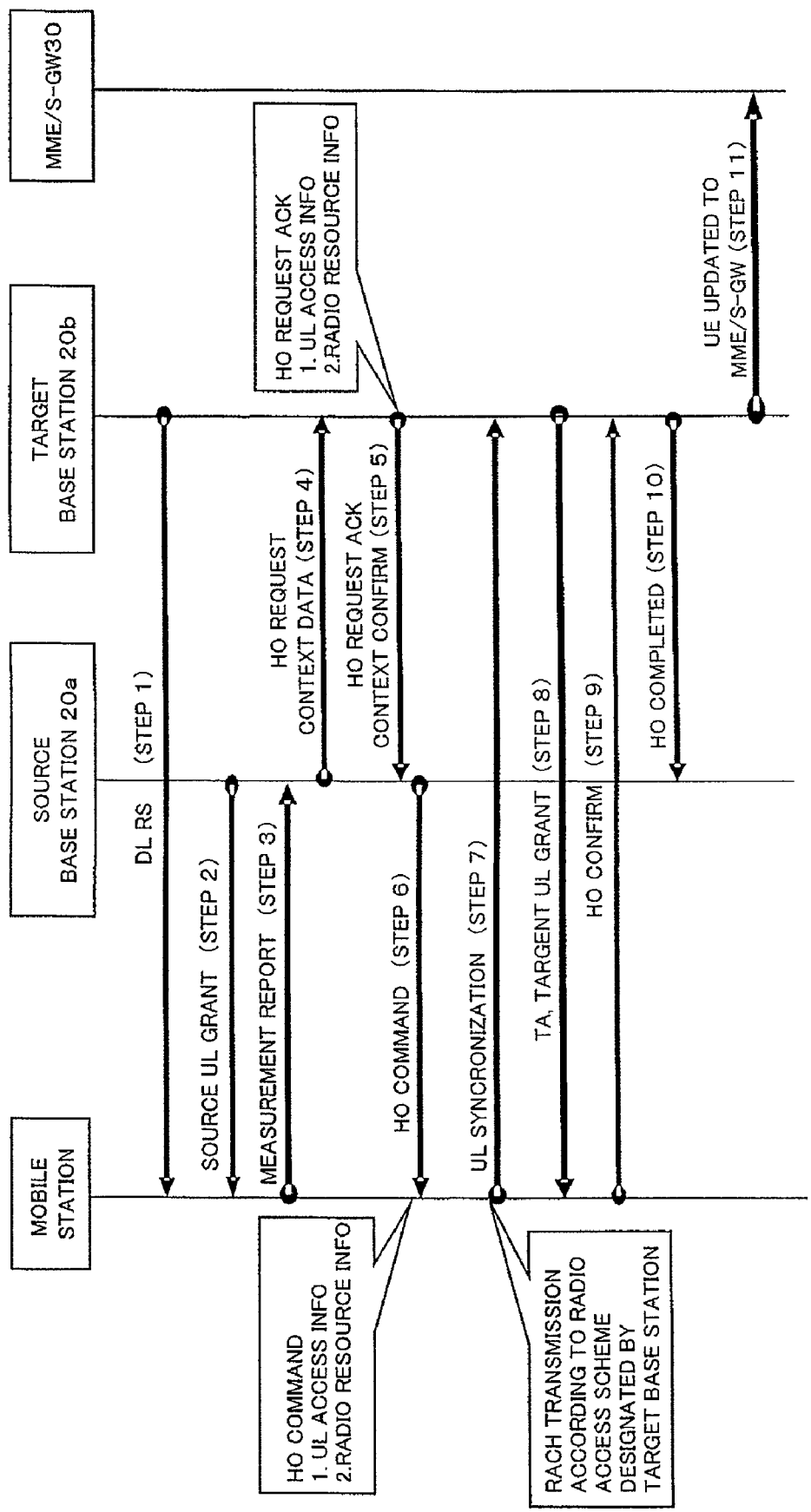
FIG. 2 is a sequence diagram to describe handover between base stations in a wireless communication system according to an example of the present invention.

FIG. 2 is a sequence diagram to describe inter-BS handover in a wireless communication system according to an example of the present invention. According to this example, each of mobile stations 10 and 11 obtains uplink radio access information (UL Access Info or uplink radio access scheme) on a target base station 20b from a handover start command (HANDOVER COMMAND or HO Command) individually received from a source base station 20a, whereby each of the mobile stations 10 and 11 can determine a radio access scheme supported by the target base station 20b.

First, in Step 1, the target base station 20b transmits a reference signal for downlink channel estimation (DL RS), and each of the mobile stations 10 and 11 receives the signal.

In Step 2, the source base station 20a transmits to each of the mobile stations 10 and 11 source base station scheduling information (UL allocation or Source UL Grant) indicating uplink resources allocated to each of the mobile stations 10 and 11 in the source base station 20a.

In Step 3, for inter-BS handover to be carried out, each of the mobile stations 10 and 11 transmits to the source base station 20a a measurement report (Measurement Report) on neighboring cells around the source cell in which the mobile station itself is currently located.

In Step 4, the source base station 20a transmits the quality of service (QoS), profile, and the like of each of the mobile stations 10 and 11 as a HANDOVER REQUEST message (Context Data) to the target base station 20b.

In Step 5, for each of the mobile stations 10 and 11, the target base station 20b determines whether or not the handover request can be accepted, and transmits a HANDOVER REQUEST ACKNOWLEDGE message (Context Confirm), which is handover acceptance information indicating the result of the determination, to the source base station 20a with transfer information included in the message. The transfer information is a transparent container which contains uplink radio access information (UL access Information) for specifying a radio access scheme for each mobile station to use in the target cell and radio resource information about time and frequency allocated for random access to the target base station 20b. At least one of the time and frequency for is random access allocated to one of the mobile stations 10 and 11 is different from that allocated to the other.

In Step 6, the source base station 20a transmits to each of the mobile stations 10 and 11 a handover start command (HO Command), which is a control signal including the handover acceptance information and the transparent container containing the uplink radio access information (UL Access Info) and radio resource information for random access with respect to the target base station 20b. Specific examples of the uplink radio access information and radio resource information for random access with respect to the target base station, included in the HO Command, will be described later.

Thus, the mobile stations 10 and 11 can identify respective uplink radio access schemes to use in the target cell from the uplink radio access information (UL Access Info) included in the received HO Command and can identify the time and frequency allocated for random access to the target base station 20b from the radio resource information for random access.

In Step 7, each of the mobile stations 10 and 11 switches to the specified uplink radio access scheme and transmits a random access signal by using an uplink random access channel (RACH), thus gaining access to the target base station 20b (UL synchronization). This random access signal (RACH signal) is generated in accordance with the uplink radio access scheme of the target base station 20b identified in Step 6.

In Step 8, the mobile stations 10 and 11 individually obtain from the target base station 20b uplink target base station scheduling information (Target UL Grant) indicating a transmission timing adjustment value (TA: Timing Advance) and uplink resources (UL allocation) allocated in the target cell.

In Step 9, each of the mobile stations 10 and 11 aligns its transmission timing in accordance with the individual transmission timing adjustment value (TA) and transmits control information (HO Confirm) to the target base station 20b by using the individually allocated uplink resources, thus notifying that the mobile station itself has been handed over.

In Step 10, the target base station 20b transmits a control signal (RELEASE RESOURCE or HO Completed) to the source base station 20a. In Step 11, the target base station 20b notifies the connected MME/S-GW 30 that the mobile stations 10 and 11 have moved through handover into the cell under its management (UE updated to MME/S-GW), whereby the inter-BS handover operation is complete.

2.2) Transfer Information

Figure 3:
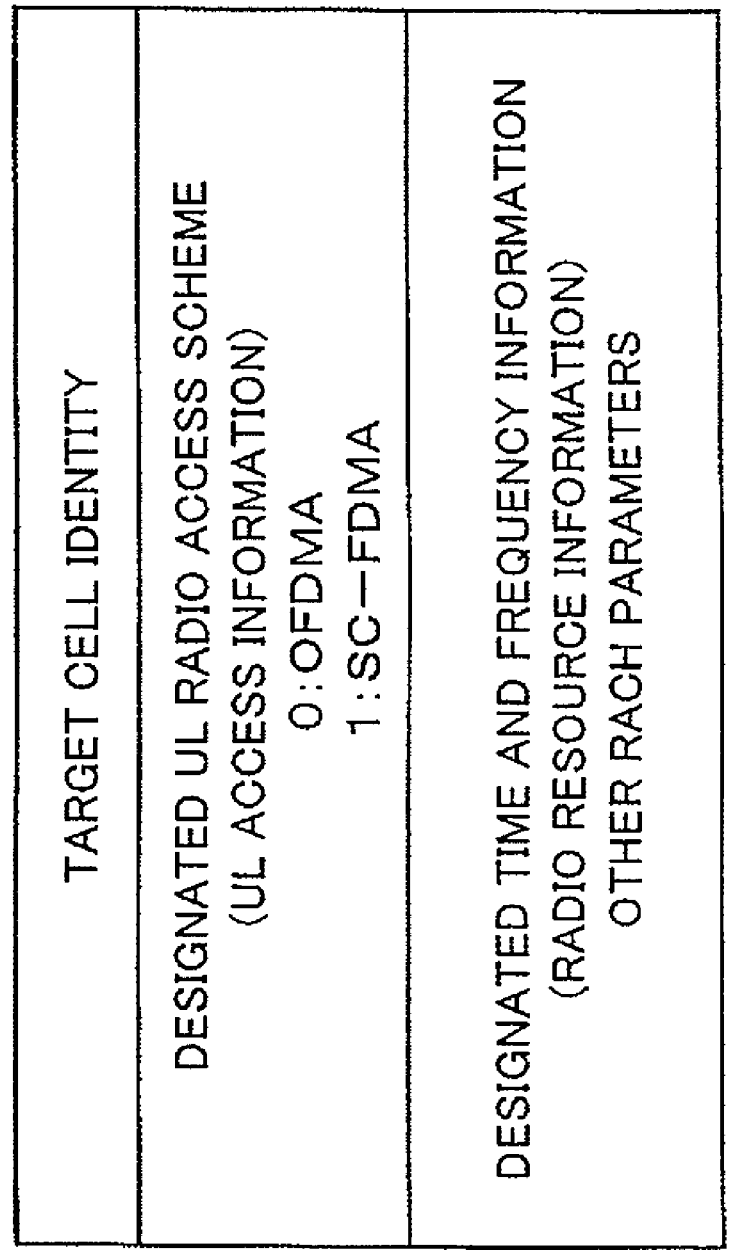
FIG. 3 is a schematic format diagram showing an example of transfer information included in Context Confirm and HO Command used in the present example.

FIG. 3 is a schematic format diagram showing an example of transfer information included in the Context Confirm and HO Command, used in the present example. The transfer information is a transparent container which is included in the Context Confirm and HO Command described above and contains parameters such as the base station ID (target cell identity) of the target base station 20b, an uplink radio access scheme and RACH radio resources (carrier frequency and time) designated by the target base station 20b, and others. For example, if two uplink radio access schemes (e.g., OFDMA and SC-FDMA) are used, any one of the schemes can be specified by one-bit information. If three or four uplink radio access schemes are used, any one of them can be specified by two-bit information.

Hereinafter, a detailed description will be given of functional configurations of a mobile station and a base station that perform the handover operation shown in FIG. 2.

2.3) Mobile Station

Figure 4:
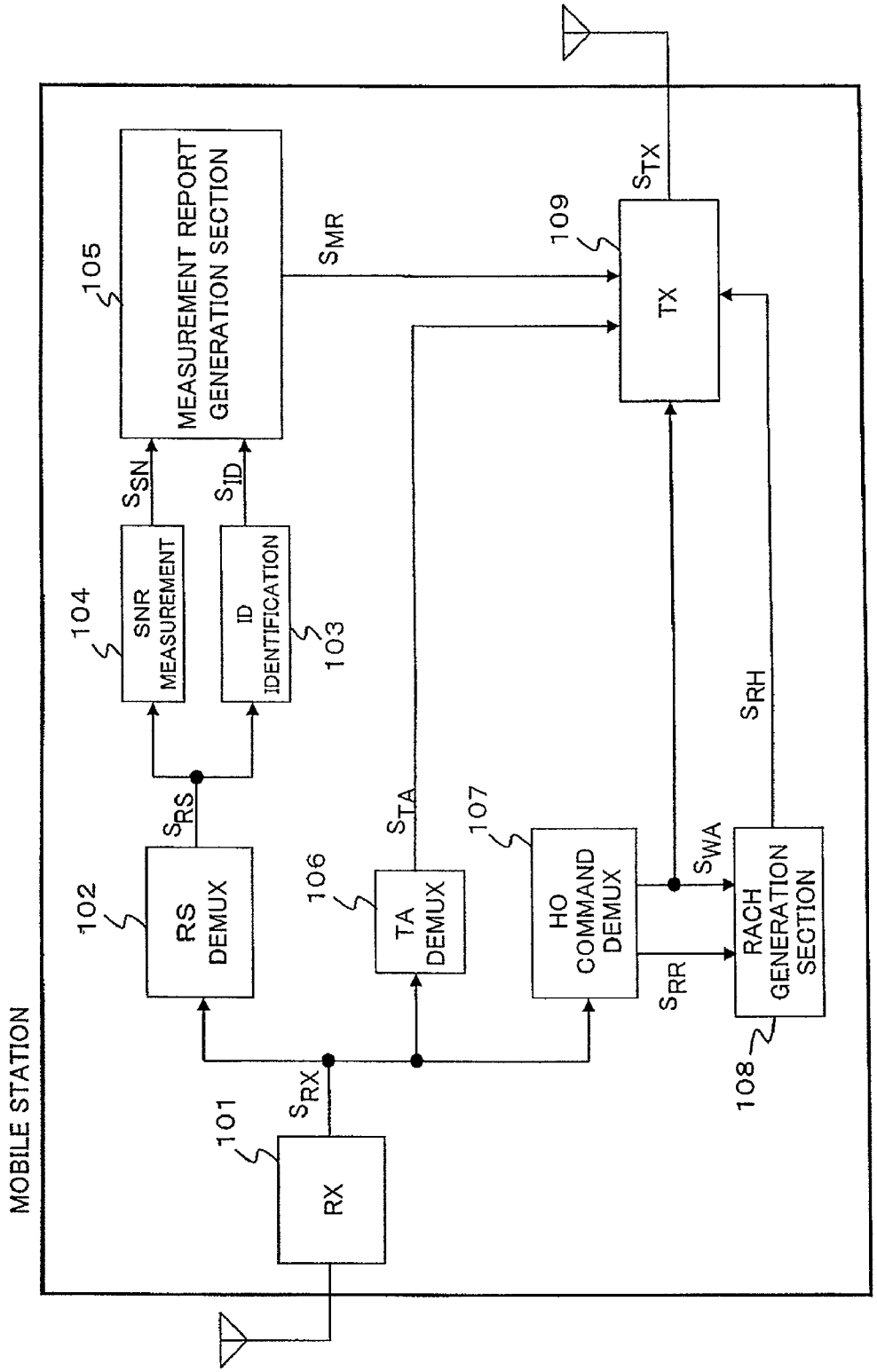
FIG. 4 is a block diagram showing a functional configuration of a mobile station in the wireless communication system according to the present example.

FIG. 4 is a block diagram showing a functional configuration of a mobile station in the wireless communication system according to the present example. Since each of the mobile stations 10 and 11 has a configuration similar to that shown in FIG. 4, "mobile station" will be used to indicate each of the mobile stations 10 and 11. Additionally, FIG. 4 shows only the functions related to the sequence shown in FIG. 2.

A reception section 101 of the mobile station receives a downlink signal from a base station (the base station 20a or 20b in the present example) and calculates the autocorrelation value during a guard interval or the like, thus establishing downlink synchronization. When having established downlink synchronization, the reception section 101 outputs a received signal $S_{RX}$ to each of a RS demultiplexing section 102, a TA demultiplexing section 106, and a HO Command demultiplexing section 107. Note that the reception section 101 is capable of performing reception operation according to any of a radio access scheme supported by the source base station 20a that the mobile station is currently connecting to and another radio access scheme designated as described later by the target base station 20b.

The RS demultiplexing section 102 receives the received signal $S_{RX}$ as input, demultiplexes a reference signal $S_{RS}$ off, and outputs the reference signal $S_{RS}$ to each of a SNR measurement section 104 and an ID identification section 103. The ID identification section 103 identifies from the downlink reference signal $S_{RS}$ the ID (base station identifier) of the base station that is the originator of the reference signal $S_{RS}$, and outputs a base station ID signal $S_{ID}$ to a Measurement Report generation section 105. If the base station forms a plurality of sectors, one of those IDs indicating these sectors is used as the base station identifier. The SNR measurement section 104 measures the reception signal-to-noise ratio (SNR) from the downlink reference signal $S_{RS}$ and outputs a SNR measurement signal $S_{SN}$ to the Measurement Report generation section 105.

The Measurement Report generation section 105 generates a Measurement Report $S_{MR}$ from the base station ID signal $S_{ID}$ and SNR measurement signal $S_{SN}$. In the present example, the Measurement Report generation section 105 generates a Measurement Report $S_{MR}$ on a neighboring cell (a candidate for target cell, which is the cell of the base station 20b in the present example) situated near the cell of the base station 20a in which the mobile station is currently located. Thus, the Measurement Report $S_{MR}$ on the cell of the target base station 20b is output to a transmission section 109 and then transmitted to the source base station 20a (Step 3 in FIG. 2).

The TA demultiplexing section 106 demultiplexes a TA signal $S_{TA}$ from the received signal $S_{RX}$ and outputs the TA signal $S_{TA}$ to the transmission section 109. The TA signal $S_{TA}$ is an uplink transmission timing adjustment value designated by a base station and enables synchronization to be established and data to be communicated between a mobile station and the base station.

The HO Command demultiplexing section 107 demultiplexes a HO Command signal from the received signal $S_{RX}$ and further extracts from the HO Command signal an uplink radio access received signal $S_{WA}$ and a RACH resource signal $S_{RR}$, which are included in the HO Command signal as a transparent container, and outputs the uplink radio access received signal $S_{WA}$ and RACH resource signal $S_{RR}$ to a RACH generation section 108. In the present example, the uplink radio access received signal $S_{WA}$ contains information specifying a radio access scheme supported by the target base station 20b, and the RACH resource signal $S_{RR}$ contains information indicating time and frequency allocated for random access to the target base station 20b.

Using the resources indicated by the RACH resource signal $S_{RR}$, the RACH generation section 108 generates a random access signal $S_{RH}$ in accordance with the radio access scheme specified by the uplink radio access received signal $S_{WA}$.

The transmission section 109 modulates the above-described Measurement Report $S_{MR}$ in accordance with a radio access scheme supported by the source base station 20a and transmits the Measurement Report $S_{MR}$ to the source base station 20a at the timing indicated by the TA signal $S_{TA}$. Moreover, the transmission section 109 modulates the random access signal $S_{RH}$ in accordance with the radio access scheme specified by the uplink radio access received signal $S_{WA}$ and transmits the random access signal $S_{RH}$ to the target base station 20b at the timing and frequency according to the RACH resource signal $S_{RR}$.

Note that the above-described handover-related functions of the mobile station can also be implemented by executing a program on a program-controlled processor such as a CPU.

2.4) Base Station

FIG. 5 is a block diagram showing a functional configuration of a base station in the wireless communication system according to the present example. Since each of the base stations 20a and 20b in the present example has a configuration similar to that shown in FIG. 5, "base station 20" will be used in the following description. Additionally, FIG. 5 shows only the functions related to the sequence shown in FIG. 2.

The base station 20 is provided with a base station ID generation section 201 and a RS generation section 202. The base station ID generation section 201 generates a base station ID signal $S_{IDB}$ of this base station 20 and outputs the base station ID signal $S_{IDB}$ to the RS generation section 202. The RS generation section 202 generates a reference signal $S_{RSB}$, whose signal sequence varies with base station ID signal $S_{IDB}$, and outputs the reference signal $S_{RSB}$ to a transmission section 217. Accordingly, each mobile station can identify the base station that manages a neighboring cell, by receiving this reference signal $S_{RSB}$.

Moreover, a reception section 203 of the base station 20 receives an uplink signal $S_{TX}$ from a mobile station and outputs the received signal $S_{RXB}$ to each of a RACH demultiplexing section 204, a HO Confirm demultiplexing section 206, and a Measurement Report demultiplexing section 208.

The RACH demultiplexing section 204 demultiplexes a random access signal $S_{RHB}$ from the received signal $S_{RXB}$ and outputs the random access signal $S_{RHB}$ to a TA generation section 205. The TA generation section 205 generates a TA transmission signal $S_{TCB}$ for aligning the transmission timing of the mobile station so that synchronization will be established between the mobile station and this base station 20 based on the timing at which the random access signal $S_{RHB}$ from the mobile station was received, and outputs the TA transmission signal $S_{TCB}$ to the transmission section 217.

The HO Confirm demultiplexing section 206 demultiplexes from the received signal $S_{RXB}$ a HO Confirm signal $S_{HCB}$, which is a signal indicating the establishment of synchronization between a mobile station and a target base station, and outputs the HO Confirm signal $S_{HCB}$ to a HO Completed generation section 207. The HO Completed generation section 207, when having received the HO Confirm signal $S_{HCB}$ as input, generates a HO Completed signal $S_{HOCB}$, which indicates the completion of preparation for handover, and outputs the HO Completed signal $S_{HOCB}$ to an inter-BS signal transmission section 216. The HO Completed signal $S_{HOCB}$ is a signal to be notified from a target base station to a source base station.

The Measurement Report demultiplexing section 208 demultiplexes from the received signal $S_{RXB}$ a Measurement Report transmitted by the mobile station and outputs it as a received Measurement Report signal $S_{MRB}$ to a Context Data generation section 215.

An inter-BS signal reception section 209 receives a signal $S_{RIB}$ from another base station and outputs an inter-BS control signal $S_{INB}$ to each of a Context Confirm demultiplexing section 210, a Context Data demultiplexing section 211, and a HO Completed demultiplexing section 212.

The Context Confirm demultiplexing section 210 demultiplexes a Context Confirm signal $S_{HRB}$ from the inter-BS control signal $S_{INB}$ and outputs the Context Confirm signal $S_{HRB}$ to a HO Command generation section 213. The HO Command generation section 213 generates a HO Command signal $S_{HOB}$ from the Context Confirm signal $S_{HRB}$ and outputs the HO Command signal $S_{HOB}$ to the transmission section 217. The HO Command signal $S_{HOB}$ is a signal to be transmitted from a source base station to a mobile station.

The Context Data demultiplexing section 211 demultiplexes from the inter-BS control signal $S_{INB}$ a Context Data signal $S_{HQB}$, which is a signal transmitted by a source base station and received by a target base station, and outputs the Context Data signal $S_{HQB}$ to a Context Confirm generation section 214. The Context Data signal $S_{HQB}$ is a signal indicating a request for a handover of a mobile station from a source base station to a target base station.

The Context Confirm generation section 214, upon receipt of the Context Data signal $S_{HQB}$, determines whether or not to permit a handover of the mobile station. The Context Confirm generation section 214 then generates a Context Confirm signal $S_{HPB}$ that includes, as part thereof, the result of this determination and a transparent container containing designation information specifying an uplink radio access scheme for the mobile station to use and radio resource information for random access to this base station 20, and then outputs the Context Confirm signal $S_{HPB}$ to the inter-BS signal transmission section 216. The uplink radio access scheme, which is assigned to each mobile station, is one predetermined for each base station or one selected from a plurality of predetermined radio access schemes. In the base station 20 according to the present example, a predetermined uplink radio access scheme (or a plurality of predetermined radio access schemes) is stored in an uplink radio access information generation section 220 and output as an uplink radio access signal $S_{WAB}$ to the Context Confirm generation section 214.

In the case where a plurality of predetermined radio access schemes are stored in the uplink radio access information generation section 220, it is also possible that the Context Confirm generation section 214 selects one radio access scheme per receipt of a Context Data signal $S_{HQB}$ for each mobile station and generates a Context Confirm signal $S_{HPB}$.

In the present example, if the base station 20 is the target base station 20b, the Context Confirm signal $S_{HPB}$, which includes handover acceptance information, information indicating an uplink radio access scheme designated by the base station 20, and the like, is transmitted to the source base station 20a through the inter-BS signal transmission section 216 (Step 5 in FIG. 2).

If the base station 20 is the source base station 20a, the Context Confirm demultiplexing section 210 demultiplexes a Context Confirm signal $S_{HRB}$ from an inter-BS control signal $S_{INB}$, and the HO Command generation section 213 generates from the Context Confirm signal $S_{HRB}$ a HO Command signal $S_{HOB}$, which is then transmitted to a mobile station in question through the transmission section 217 (Step 6 in FIG. 2).

The Context Data generation section 215 receives as input the received Measurement Report signal $S_{MRB}$ and generates, as a Context Data signal $S_{HTB}$, information for requesting that the mobile station be handed over from the source base station to the target base station. If the base station 20 is the source base station 20a, the Context Data signal $S_{HTB}$ is notified to the target base station 20b (Step 4 in FIG. 2).

As described above, when the inter-BS signal transmission section 216 receives as input any one of the HO Completed signal $S_{HOCB}$, Context Confirm signal $S_{HPB}$, and Context Data signal $S_{HTB}$, the inter-BS signal transmission section 216 transmits the input signal to another base station.

When the transmission section 217 receives as input any one of the downlink RS signal $S_{RSB}$, TA transmission signal $S_{TCB}$, and HO Command signal $S_{HOB}$, the transmission section 217 transmits the input signal to a mobile station as a downlink signal $S_{TXB}$.

Incidentally, when the HO Completed demultiplexing section 212 has demultiplexed a HO Completed signal from the inter-BS control signal $S_{INB}$, and if this HO Completed signal indicates the completion of preparation for a handover of the mobile station, then the handover processing is complete.

Note that the above-described handover-related functions of the base station 20 can also be implemented by executing a program on a program-controlled processor such as a CPU.

2.5) Effects

According to the above-described example of the present invention, even in a case where different base stations support different radio access schemes in a single wireless communication system, a mobile station can identify a handover target's radio access scheme without receiving common control information. As a result, it is possible to perform fast handover between base stations without increasing a delay in handover.

The present invention is applicable in a case where different base stations support different radio access schemes in a 3GPP LTE system, for example.

The present invention may be embodied in other specific forms without departing from the spirit or essential characteristics thereof. The above-described exemplary embodiment and example are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for handover between base stations in a wireless communication system which includes a plurality of base stations and at least one mobile station, wherein each of the plurality of base stations supports at least one of two or more radio access schemes and the mobile station is operable in the two or more radio access schemes, the method comprising:
    before the mobile station moves from a first base station to a second base station, the second base station notifying the mobile station, via the first base station, of transfer information which specifies a radio access scheme allowing the mobile station to make at least initial connection to the second base station; and
    before the mobile station moves from the first base station to the second base station, the mobile station recognizing the radio access scheme of the second base station from the transfer information,
    wherein the second base station notifies the mobile station, via the first base station, of the transfer information which specifies a selected one of the two or more radio access schemes, when the second base station supports the two or more radio access schemes, to make the at least initial connection during a handover from the first base station to the second base station.

2. The method according to claim 1, wherein the first and second base stations are of a common radio transmission system.

3. The method according to claim 1, wherein in response to a handover request received from the first base station, the second base station transmits back to the first base station handover acceptance information including the transfer information, wherein the transfer information is transferred from the first base station to the mobile station.

4. The method according to claim 1, wherein
    in response to a HANDOVER REQUEST message received from the first base station, the second base station transmits back to the first base station a HANDOVER REQUEST ACKNOWLEDGE message which includes, as part thereof, the transfer information; and
    the first base station, when having received the HANDOVER REQUEST ACKNOWLEDGE message, transmits a HANDOVER COMMAND including the transfer information to the mobile station.

5. A base station in a wireless communication system which includes two or more radio access schemes, comprising:
    a communication section for communicating with a mobile station in a least one of two or more radio access schemes, and
    a notifying section for notifying the mobile station, via another base station, of transfer information which specifies a radio access scheme allowing the mobile station to make at least initial connection to the base station before the mobile station moves from the other base station to the base station,
    wherein the base station notifies the mobile station, via the another base station, of the transfer information which specifies a selected one of the two or more radio access schemes, when the base station supports the two or more radio access schemes, to make the at least initial connection during a handover from the another base station to the base station.

6. The base station according to claim 5, wherein the base station and the other base stations are of a common radio transmission system.

7. The base station according to claim 5, wherein in response to a handover request received from the other base station, the notifying section transmits back to the other base station handover acceptance information including the transfer information.

8. A mobile station which is capable of communicating with a plurality of base stations, each of which supports at least one of two or more radio access schemes, comprising:
- a demultiplexer for demultiplexing transfer information from a control signal received via a first base station from a second base station before the mobile station moves from the first base station to the second base station, wherein the transfer information specifies a radio access scheme allowing the mobile station to make at least initial connection to the second base station; and
- a communication section for performing the initial connection to the second base station according to the radio access scheme of the second base station included in the transfer information,
- wherein the second base station notifies the mobile station, via the first base station, of the transfer information which specifies a selected one of the two or more radio access schemes, when the second base station supports the two or more radio access schemes, to make the at least initial connection during a handover from the first base station to the second base station.

9. The mobile station according to claim 8, wherein the first and second base stations are of a common radio transmission system.

10. The mobile station according to claim 8, wherein the control signal received from the first base station is handover acceptance information which is transmitted by the second base station in response to a handover request that the second base station has received from the first base station.

11. A wireless communication system comprising a plurality of base stations and at least one mobile station, wherein each of the plurality of base stations supports at least one of two or more radio access schemes and the mobile station is operable in the two or more radio access schemes, wherein
each of the plurality of base stations comprises:
- a base station communication section for communicating with a mobile station in at least one of two or more radio access schemes; and
- a notifying section for notifying the mobile station, via another base station currently communicating with the mobile station, of transfer information which specifies a radio access scheme allowing the mobile station to make at least initial connection to the base station before the mobile station moves from said other base station to the base station, and the mobile station comprises:
- a demultiplexer for demultiplexing transfer information from a control signal via a first base station from a second base station before the mobile station moves from the first base station to the second base station, wherein the transfer information specifies a radio access scheme allowing the mobile station to make at least initial connection to the second base station; and
- a mobile station communication section for performing the initial connection to the second base station according to the radio access scheme of the second base station included in the transfer information,
- wherein the second base station notifies the mobile station, via the first base station, of the transfer information which specifies a selected one of the two or more radio access schemes, when the second base station supports the two or more radio access schemes, to make the at least initial connection during a handover from the first base station to the second base station.

12. The wireless communication system according to claim 11, wherein the first and second base stations are of a common radio transmission system.

13. A computer program, embedded in a non-transitory computer readable medium, instructing a program-controlled processor of a base station in a wireless communication system which includes two or more radio access schemes, comprising:
- before a mobile station moves from another base station to the base station, notifying the mobile station, via said other base station, of transfer information which specifies a radio access scheme allowing the mobile station to make at least initial connection to the base station,
- wherein the base station notifies the mobile station, via the another base station, of the transfer information which specifies a selected one of the two or more radio access schemes, when the base station supports the two or more radio access schemes, to make the at least initial connection during a handover from the another base station to the base station.

14. The computer program according to claim 13, wherein the base station and the other base stations are of a common radio transmission system.

15. A computer program, embedded in a non-transitory computer readable medium, instructing a program-controlled processor of a mobile station which is capable of communicating with a plurality of base stations, each of which supports at least one of two or more radio access schemes, comprising:
- demultiplexing transfer information from a control signal received via a first base station from a second base station before the mobile station moves from the first base station to the second base station, wherein the transfer information specifies a radio access scheme allowing the mobile station to make at least initial connection to the second base station; and
- performing the initial connection to the second base station according to the radio access scheme of the second base station included in the transfer information,
- wherein the second base station notifies the mobile station, via the first base station, of the transfer information which specifies a selected one of the two or more radio access schemes, when the second base station supports the two or more radio access schemes, to make the at least initial connection during a handover from the first base station to the second base station.

16. The computer program according to claim 15, wherein the first and second base stations are of common radio transmission system.

* * * * *